May 22, 1923.
R. HARTMANN
MACHINE FOR UNITING TOGETHER THE THREADS OF TWO WARPS
Filed March 25, 1921    12 Sheets-Sheet 1
Fig. 1.
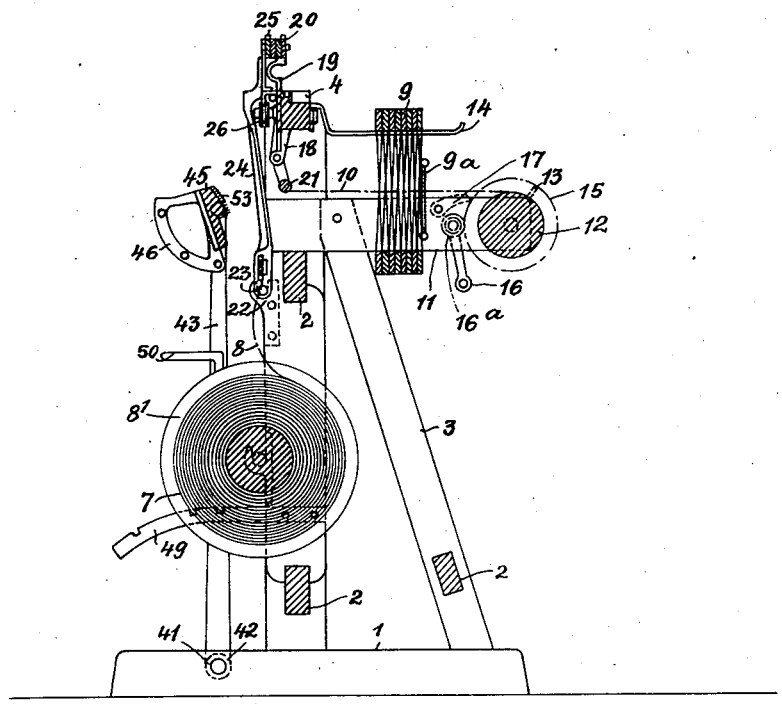
Fig. 40.    Fig. 41.    Fig. 42.
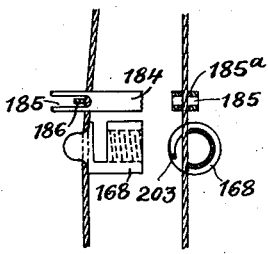 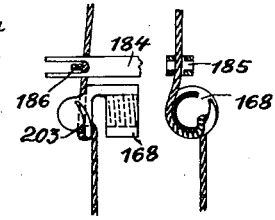 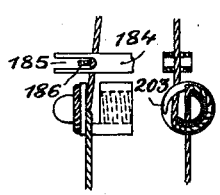
Inventor
R. Hartmann,
By Marks & Clerk
Attys.

May 22, 1923.                                                                1,456,006
R. HARTMANN
MACHINE FOR UNITING TOGETHER THE THREADS OF TWO WARPS
Filed March 25, 1921          12 Sheets-Sheet 2
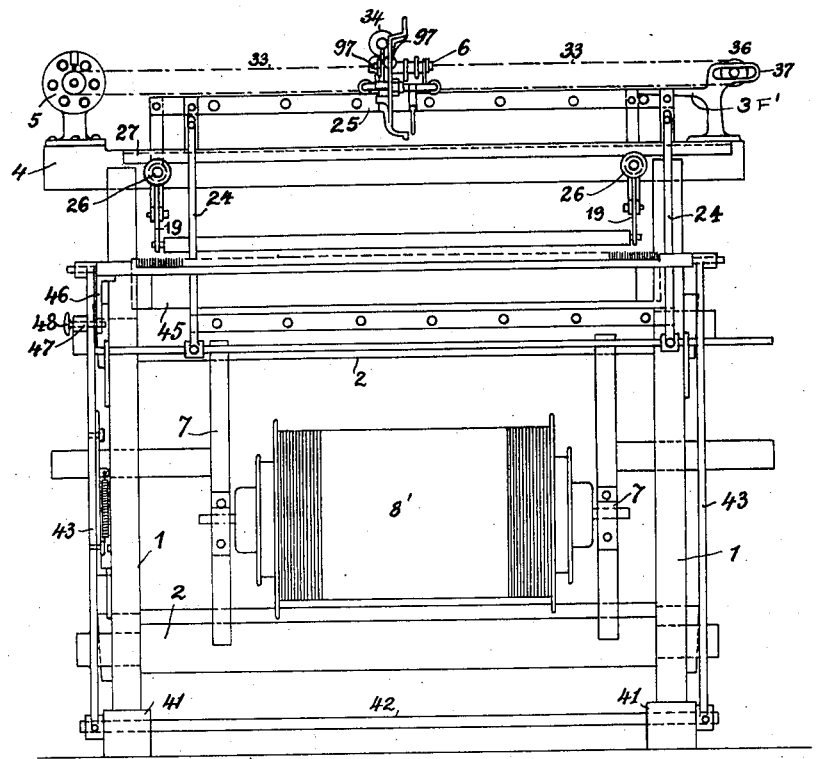
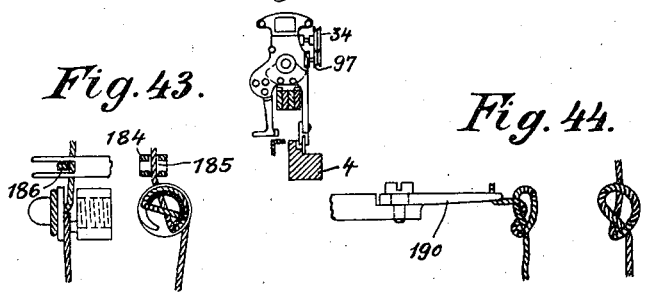
Inventor
R. Hartmann,
By Marks & Clerk
Attys.

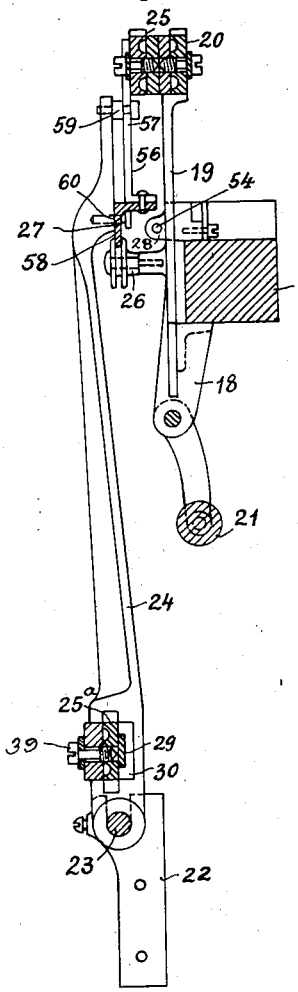
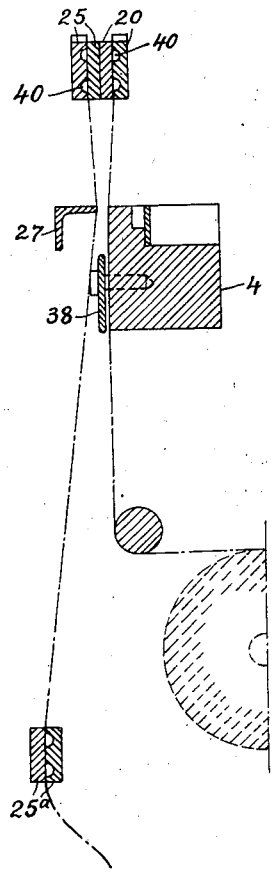

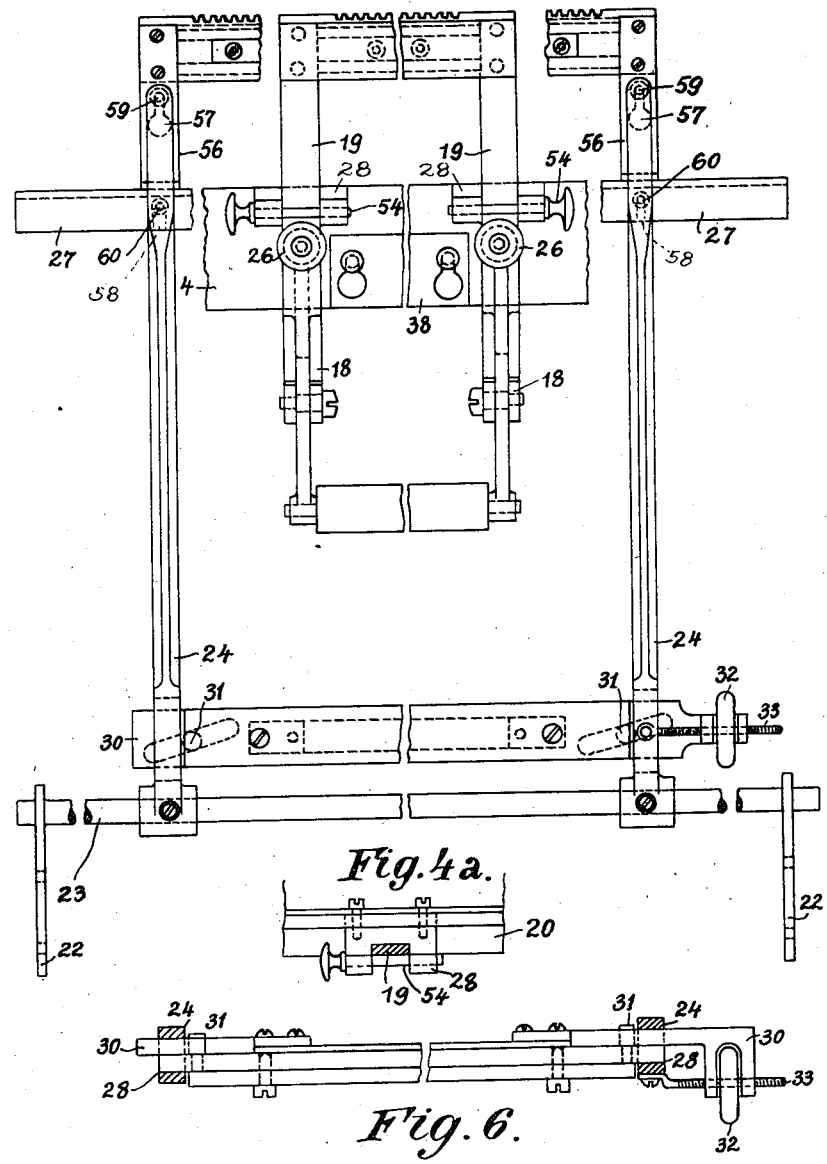

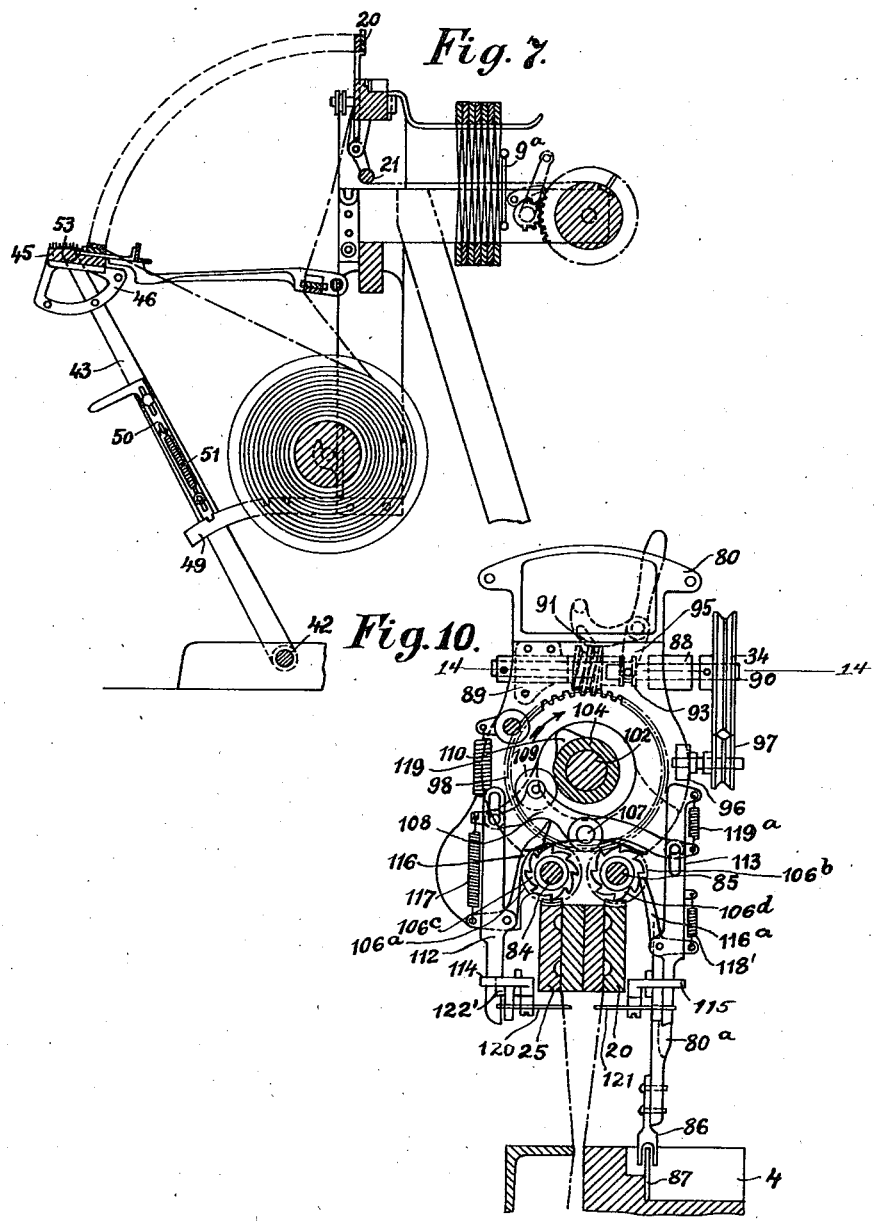

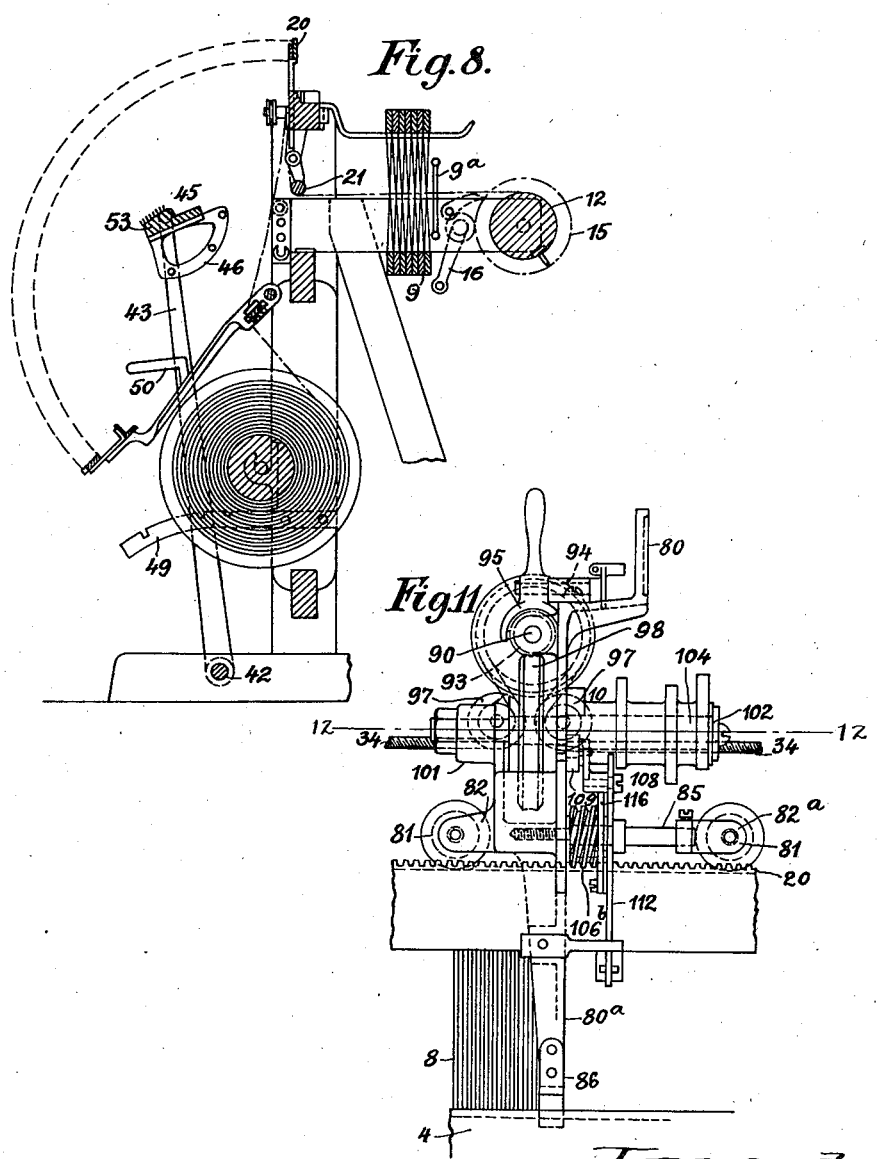

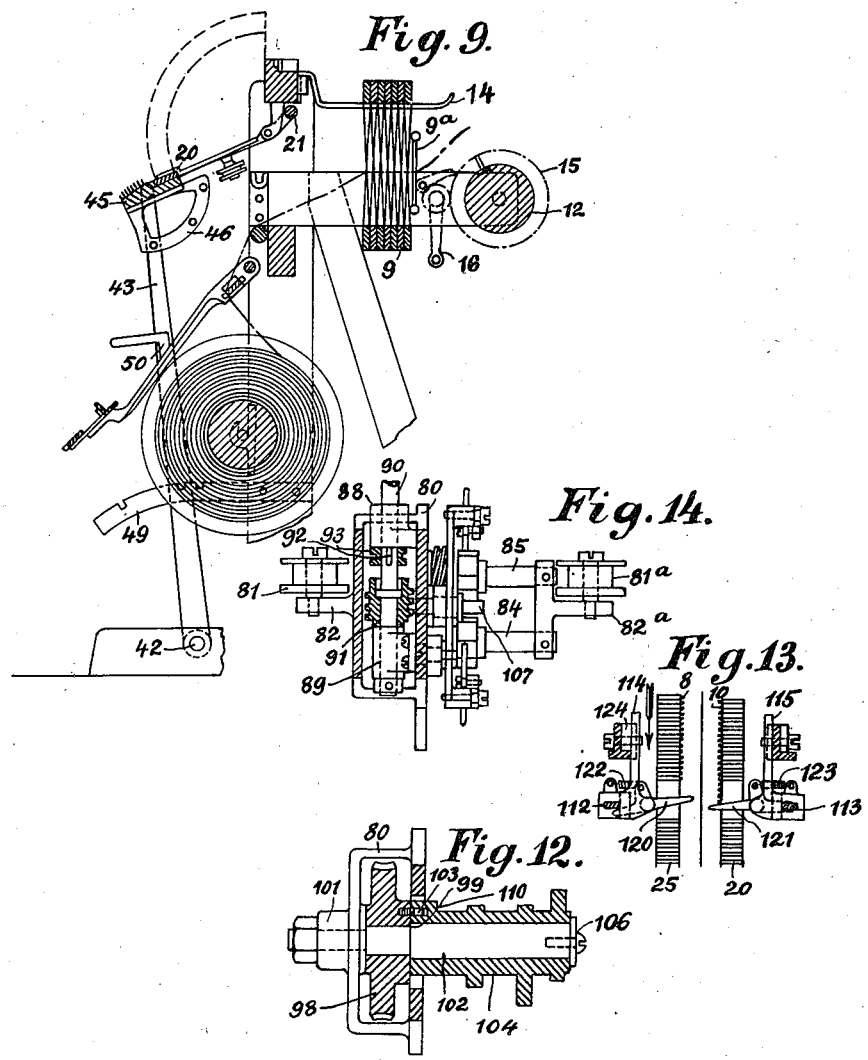

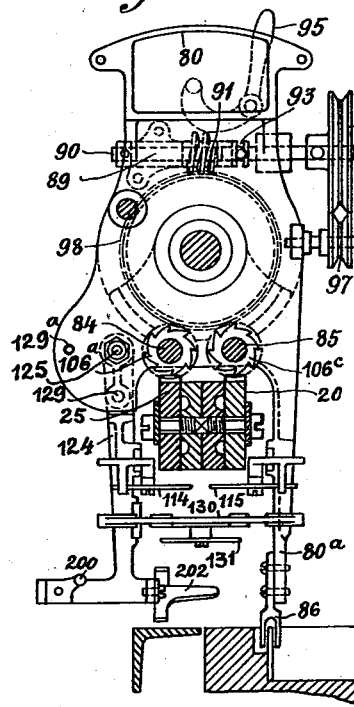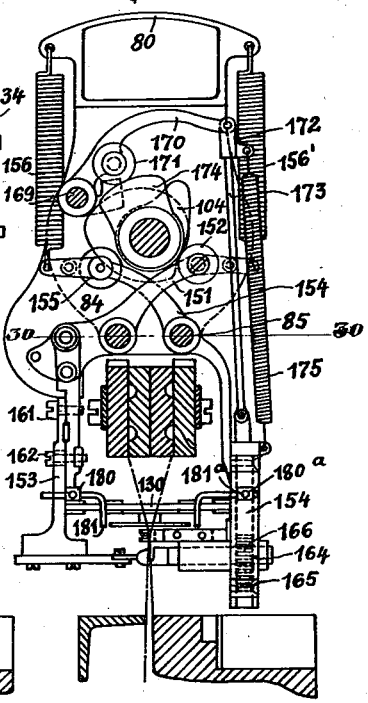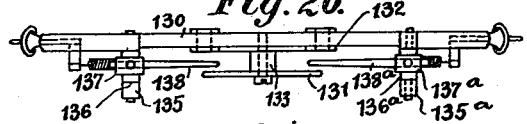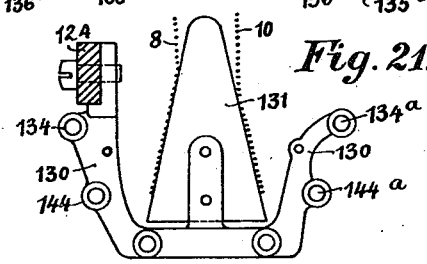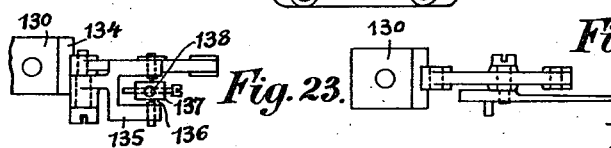

May 22, 1923.
R. HARTMANN
1,456,006
MACHINE FOR UNITING TOGETHER THE THREADS OF TWO WARPS
Filed March 25, 1921   12 Sheets-Sheet 9
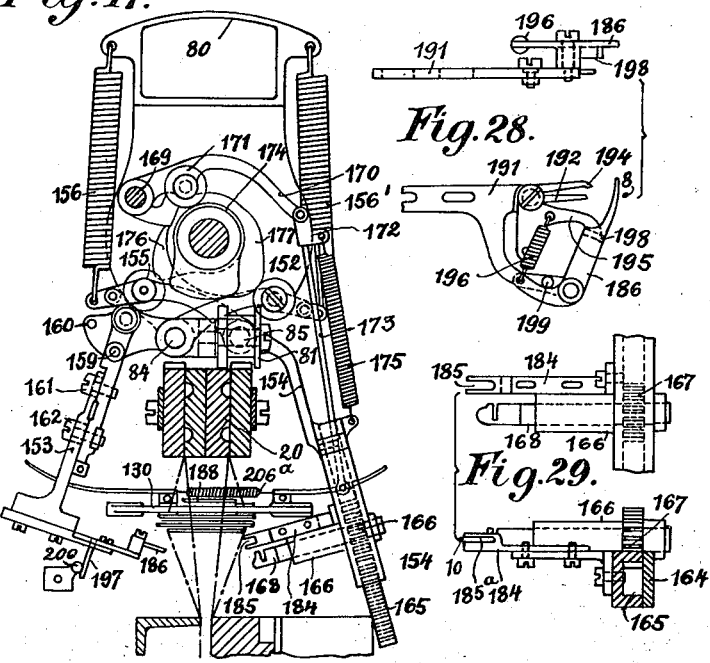
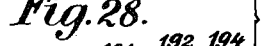
Fig. 28.
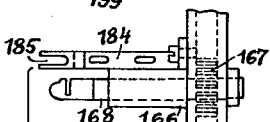
Fig. 29.
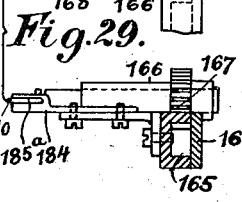
Fig. 22.
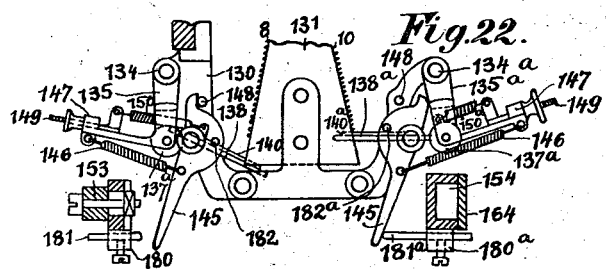
Fig. 26.
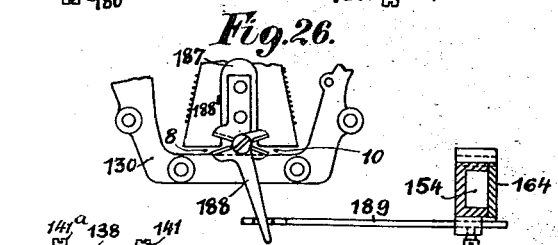
Fig. 27.
Inventor
R. Hartmann
By Marks & Clerk
Attys.

May 22, 1923.
R. HARTMANN
MACHINE FOR UNITING TOGETHER THE THREADS OF TWO WARPS
Filed March 25, 1921   12 Sheets-Sheet 10
1,456,006
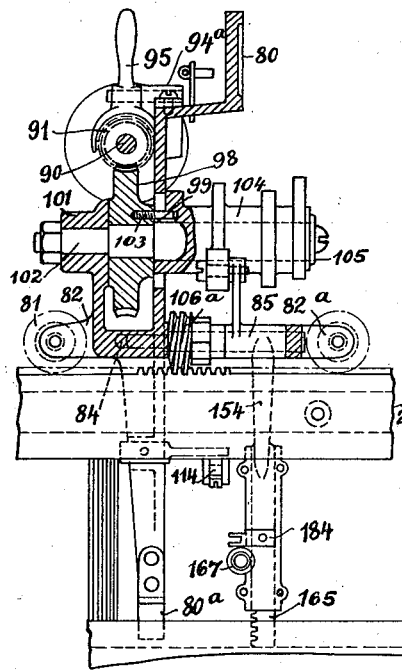
Fig. 18.
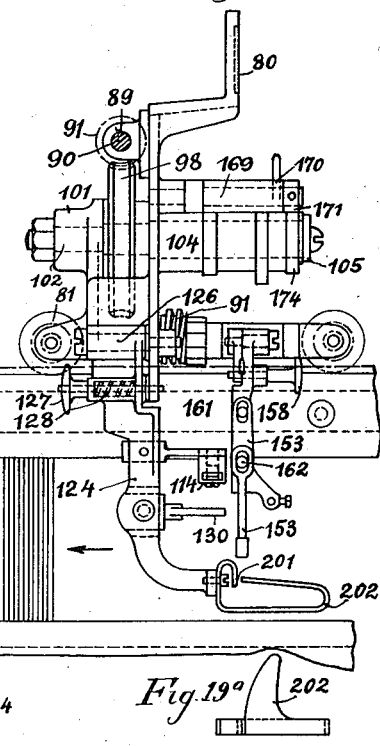
Fig. 19.
Fig. 19ª
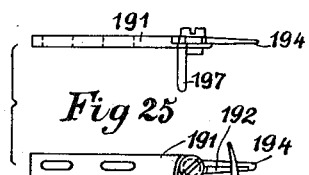
Fig. 25
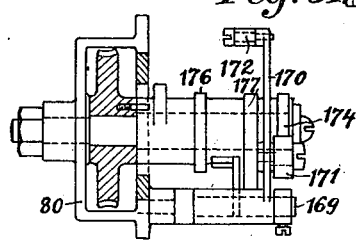
Fig. 30.
Fig. 31.
Inventor
R. Hartmann,
By Marks&Clerk
Attys.

May 22, 1923.   1,456,006
R. HARTMANN
MACHINE FOR UNITING TOGETHER THE THREADS OF TWO WARPS
Filed March 25, 1921   12 Sheets-Sheet 11

Inventor
R. Hartmann
By Marks & Clerk
Attys.

May 22, 1923. 1,456,006
R. HARTMANN
MACHINE FOR UNITING TOGETHER THE THREADS OF TWO WARPS
Filed March 25, 1921 12 Sheets-Sheet 12

Inventor
R. Hartmann,
By Marks & Clerk
Attys.

Patented May 22, 1923.

1,456,006

UNITED STATES PATENT OFFICE.

ROBERT HARTMANN, OF USTER, SWITZERLAND.

MACHINE FOR UNITING TOGETHER THE THREADS OF TWO WARPS.

Application filed March 25, 1921. Serial No. 455,433.

(GRANTED UNDER THE PROVISIONS OF THE ACT OF MARCH 3, 1921, 41 STAT. L., 1313.)

*To all whom it may concern:*

Be it known that I, ROBERT HARTMANN, a citizen of Switzerland, residing at Uster, in the county of Zurich, Switzerland, have invented certain new and useful Improvements in Machines for Uniting Together the Threads of Two Warps (for which I have filed applications in Switzerland on 8th Sept., 1919, No. 1,328; in Germany on 1st February, 1921, appln. No. 84,101; and in Great Britain on 7th February, 1921, appln. No. 4,405), of which the following is a specification.

Machines have already been proposed for knotting, that is to say, for connecting together the ends of two warps. In those machines the two warps are arranged horizontally one above the other. This arrangement requires overmuch space for straining the warps in the machine. Moreover such machines are very complicated and costly.

In the improved machine according to this invention the above stated drawbacks are considerably mitigated, and the space required for erecting and operating the machine need not be much wider and deeper than the loom on which the new warp is to be used.

A constructional form of the improved machine is illustrated by way of example in the accompanying drawings in which:—

Fig. 1 is a side elevation of a portion of the improved machine, some parts being shown in section and Fig. 2 is a front elevation thereof, some parts being shown in section.

Fig. 2$^a$ illustrates a detail of Fig. 2.

Fig. 3 is a side elevational detail, partly in section of the clamping bars and their supports, Fig. 4 is a front elevational view of the same, Fig. 4$^a$ illustrates a detail of Fig. 2.

Fig. 5 is a diagrammatic view of parts of the machine being shown in section to illustrate the relation of the thread to the clamping bar.

Fig. 6 is a plan of Fig. 4.

Figs. 7 to 9 are end elevational details partly in section of the machine in different positions.

Figs. 10 and 11, show the upper portion of the improved machine in side and front elevation; the parts being shown in different positions.

Fig. 12 is a section on line 12—12 of Fig. 11,

Fig. 13 illustrates on a reduced scale a plan of details of Fig. 10, some parts being shown in section.

Fig. 14 is partly a section on line 14—14 of Fig. 10,

Figs. 15 to 19 show the upper portion of the improved machine in side and front elevation; the parts being shown in different positions.

Fig. 19$^a$ shows a plan of a detail of Fig. 19,

Fig. 20 is a front elevation of Fig. 22,

Fig. 21 illustrates on a larger scale certain parts of Fig. 22,

Fig. 22 is a plan of a portion of Fig. 16,

Fig. 23 is a side elevation shown from the left hand of Fig. 22, the part 145 being removed, Fig. 24 is the same elevation as Fig. 23, the part 135 being removed.

Figs. 25 and 28 illustrate in an elevation and a plan a tong mechanism in two different positions.

Fig. 26 shows a plan of a shears mechanism,

Fig. 27 is an elevation and a plan of a selecting needle and the needle carrier.

Fig. 29 is a plan and elevational detail of the knotting mechanism,

Fig. 30 is a plan view on line 30—30 of Fig. 16 a part being shown in section.

Fig. 31 is a plan view of parts of Fig. 16 some parts being shown in section.

Figs. 32 to 38 show the upper portion of the improved machine in side and front elevation; the parts being shown in different positions.

Figure 38:
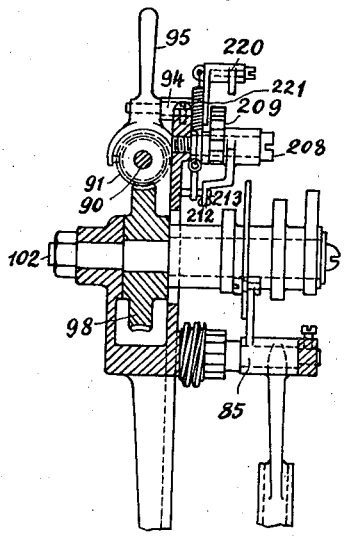
Figure 39:
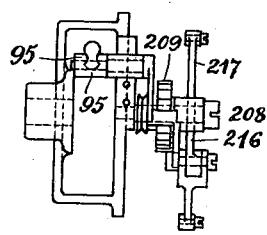

Fig. 39 is a plan view of parts of Fig. 38,

Figs. 40 to 43 show parts of the knotting mechanism at different positions, and

Fig. 44 shows another part of the mechanism.

In Figs. 1 and 2:—1, 1 are the side frames of the framing of the machine which is stiffened by cross pieces 2 and struts 3; it carries at its upper end the knotting beam 4. This beam is mounted on the framing in such a manner that the said beam, together with the hereinafter described parts that are mounted on it, can be readily removed from the framing.

On this beam 4 there are arranged an electric motor 5 and the actual knotting mechanism 6 (Figs. 1, 2 and 2$^a$). On the cross pieces 2 there are slidably mounted two bearings 7 that are adapted to receive the warp beam 8' with the new warp beamed upon the latter.

A beam 12, adapted to receive the old warp 10, is mounted in side brackets 11 of the framing. This beam 12 carries a rake 13 on to which the old warp is hung by means of its last remnant of cloth.

The heddles 9 and reed $9^a$ of this old warp are hung up on supports 14 of the knotting beam.

A long pinion $16^a$, with crank 16 fixed thereon, is mounted on one side bracket 11 of the framing. This pinion $16^a$ meshes with a spur wheel which is fixed on the warp beam 12, and in which a pawl 17 mounted on the bracket 11, engages so that the beam 12 can be rotated, and the warp 10 can be strained by means of the crank 16.

For the purpose of clamping the old warp 10, two bearings 18 for carrying levers 19 are mounted on the knotting beam 4 (Figs. 1, 3 and 4). These levers 19 carrying at their upper ends a pair of clamping bars 20, and at their lower ends a guide roller 21 for the old warp.

For the reception of the new warp 8, there is bolted to each side frame a bearing 22 which is open at its upper end and carries a guide rod 23.

This guide rod carries the clamping bar supports 24 to which the clamping bars 25 are bolted.

Each lever 19 carries a guide roller 26 which, when it is in the position shown in Fig. 1, receives the L-shaped guide bar 27 that is fixed to the supports 24.

From the foregoing it will be perceived that the clamping bars 20, for clamping the old warp will, after previous removal of the clamping bars 25, be capable of being rotated by means of the levers 19 in the downward direction around the axes of the bearings 18, whereas they remain stationary in the transverse direction.

The clamping bars 25 for clamping the new warp, are adapted to be slidden sideways by means of the rollers 26 in which the bar 27 is suspended. On being raised a short distance these clamping bars 25 can also be rotated downwards around the axis of the bearing 22.

For straining the new warp a second pair of clamping bars $25^a$ is provided (Figs. 3 to 6), one of which is loose in the slots 28 of the supports 24, whereas the other clamping bar can be pressed by means of screws 39 against the first mentioned clamping bar $25^a$. The pair of bars $25^a$ is further supported by means of studs 31 in upwardly sloping slots in the jaws 30 that are connected together by the bar 29. Fixed to one of the supports 24 is a long screw 33 on which works a screwthreaded handwheel 32 that is itself guided in a fork forming part of one of the jaws 30 (Fig. 6).

By suitably rotating the handwheel 30 the jaws can be slidden to the right or to the left with the result that by the action of the inclined slots the clamping bars $25^a$ will be raised or lowered, and thus the clamped warp can be strained.

For receiving the connected warp ends there serves a bar 38 (Fig. 5) that is removably arranged on the knotting beam 4. When the two warps have been connected to each other they are removed, together with the heddles 9 and reed $9^a$, from the machine, to make way for a fresh pair of warps.

As hereinbefore stated, the three pairs of clamping bars 20, 25 and $25^a$, serve for clamping the ends of the new and the old warp. For the purpose of affording a secure holding of the warp ends within the clamping bars, one bar of each pair is fitted with two semi-circular soft inlays 40, for instance, of rubber (Figs. 3 and 5).

To allow of the removal of the connected warps from the machine, that is to say, to allow the two clamping bar supports to be turned down, a shaft 42 is mounted on the feet of the framing at 41, and on this shaft are fixed two upwardly extending arms 43 (Figs. 1 and 2). These arms carry at their upper ends a wooden slot 45 carrying in its turn a sector 46.

This slat 45 can be fixed at different inclinations by means of a set pin 48 inserted in an eye 47 in one of the arms 43 and of some holes formed in the sector 46.

Further, as shown in Figs. 1 and 7 to 9, there is provided on the framing 1 a locking sector 49 furnished with three notches; and a locking member 50 is slidably mounted on one of the arms 43. A coiled spring attached at one end to the locking member and at its other end to the arm 43, has a constant tendency to pull the locking member down, that is, into one of the notches of the locking sector 49.

On pulling up the locking member, the levers 43 with the slat 45 can be rotated outwards, and then the levers 24 with the clamping bar 25, and levers 19 with the clamping bar 20, can be rotated into one of the positions shown in Figs. 7 to 9.

53 is a card clothed with closely set fine steel wire teeth; it serves to hold each separate warp thread, until the entire warp web can be clamped as hereinafter described.

For holding the clamping bars 20 in the position shown in Fig. 7, the bearings 28, fixed to the knotting beam 4, are provided with eyes through which pins 54 (Figs. 3, 4 and $4^a$) can be inserted in front of the arms 19. Consequently the studs 54 must be withdrawn before the arms, together with the clamping bars can be turned down.

As hereinbefore stated, the knotting beam 4 can be removed from the framing 1, leaving the supports 24 with the guide rod 23 and the pair of clamping bars 25ᵃ behind. For this purpose the bar 27 is connected rigidly at each end to one of the clamping bars 25 by means of a bracket 56 (Figs. 3 and 4).

Each of the latter has a downwardly widening slot 57 closed at each end. Each of the opposite arms has an annularly grooved stud 59.

The bar 27 has at each end a slot 58 that is open on its underside. Each of the arms has a headed stud 60.

From the foregoing it will be readily perceived that, in order to remove the knotting beam with the parts 19 and 38, it is merely necessary to lift the said beam to such a height as will cause the studs 60 to pass out of the slots 58, whereupon the knotting beam and the parts supported thereby may be removed by sliding it sideways so that the heads of the studs 59 can pass through the wide portions of the slots 57.

The knotting mechanism is illustrated in Figs. 10 to 44, and is constructed as follows:—

In Figs. 10 to 19:—80 is a frame with cast-on lugs 82 for the reception of a grooved guide roller 81. A second guide roller 81ᵃ is rotatably mounted on the connecting member 82ᵃ (Fig. 14) which is supported by horizontal columns 84, 85 bolted to the frame.

Further the frame 80 is provided with a downward extension 80ᵃ carrying a fork 86 which is adapted to travel straddlewise along a bar 87 that is bolted to the knotting frame 4, for the purpose of keeping the frame in an upright position. The whole constitutes the carriage for the hereinafter described knotting mechanism which is guided horizontally by the pair of clamping bars 20 by means of the rollers 81 and 81ᵃ.

The frame 80 has fixed to it two bearings 88 and 89 for the reception of the driving shaft 90. This shaft has fixed on it a rope pulley 34, a clawed-driver 93 capable of being slid by means of a groove and feather 92, and a loose worm 91 formed with cross grooves for the driving claws. In a bearing 94 fixed to the frame 80 there is mounted a shifting fork 95 which engages by means of two pins in the groove of the driver 93, so that the latter can be brought into and out of engagement by means of its claw with the cross grooves of the worm 91 by suitable rotation of the fork 95.

The knotting mechanism is driven from the motor 5 by means of an endless rope 33 (Figs. 2 and 11) which passes around the driving pulley 34 and the guide pulleys 97 (that are supported in lugs 96 of the frame 80), and also around the pulley 36 of the tightening bearing 37.

An arm 37′ of the tightening bearing 37 serves also the purpose of receiving the knotting mechanism after the work has been completed outside of the clamping bars.

To the eye 101 of the frame 80 there is bolted a bolt 102 (Figs. 10 to 12), on which there is loosely mounted the worm wheel 98 that engages with the worm 91. This worm wheel is prevented from axial motion on one side by means of a shoulder 99 and on the other side by means of the eye 101.

104 is a sleeve connected by means of a driving stud 103 to the worm wheel 98; the sleeve 104 is mounted on the bolt 102 and has fixed on it a number of cams.

This sleeve is prevented by a retaining washer 105 from slipping off the bolt 102.

On each of the aforesaid columns 84 and 85, there is loosely mounted a worm 106ᵃ and 106ᵇ respectively with interposed ratchet wheels 106ᶜ and 106ᵈ, of which each is protected from axial movement on one side by the frame 80 and on the other side by a shoulder of the respective column 84, 85.

The worm 106ᵃ engages in teeth formed on the upper part of the bar 25; whereas the worm 106ᵇ engages with the teeth on the bar 20.

Above the two worms aforesaid, there is bolted to the frame 80 a bolt 107 on which is mounted loose a lever 108 (Figs. 10 and 14). One arm of this lever carries an antifriction roller 109 which is acted upon by the cam 110, whilst at the other end of the same arm a coiled spring 119 in combination with the frame 80, acts to pull the lever 108 against the eccentric cam 110.

At each end of the lever 108 there engages by means of a slot, a feed rod 112 and 113 respectively which is guided at its lower part by means of an arm 114, 115 respectively (Figs. 10 and 13), and of which each carries at its bottom part a ratchet pawl 116 and 116ᵃ respectively. The spring 117 which is attached at one end to a side arm of the lever 108, and at its other end to a side arm of the pawl 116, has a constant tendency to pull the feed rod 112 upwards until the pawl engaging in the latter bears against the lower wall of the slot.

This spring also presses the pawl 116 against the ratchet wheel 106. The spring 119ᵃ engages the bar 113 and has a constant tendency to pull the latter down until the upper wall of the slot bears against the sliding pin of the lever 108.

The spring 118′ which engages at one end a lug on the bar 113 and at its other end the push pawl 116ᵃ, presses the push pawl against the ratchet wheel 106ᵈ.

From the foregoing it will be perceived that each time on the operation of the roller 109 by the cam 110, the bar 112 is depressed, whereas the bar 113 is raised and consequently the ratchet wheels 106ᶜ, 106ᵈ, and with them the worms 106ª, and 106ᵇ are rotated in the same direction.

An arm 114, hereinbefore referred to, is bolted to the adjusting arm 124 (hereinafter again referred to,), and an arm 115 is bolted to the extension 80ª of the frame 80 (Figs. 10, 11, 13 and 15).

Each of these arms has pivoted to it a small feeler lever 120, 121 respectively which are pulled by light tension springs 122, 123 into a position of rest in which their outer arms are situated out of the range of the feed rods 112, 113.

In the position shown in Fig. 13, the thread feeler 121 bears at one end on the warp web 10, whereas another end engages with the underside of the feed bar 113.

In the position shown in Fig. 13, the thread feeler 120 does not bear against the warp web 8; its outer arm is caused, by the spring 122, to lie by the side of the feed bar 112. In the position of the feed bars shown in Fig. 10, none of the feelers 120, 121 bears against one of the two warp webs, consequently they are not in engagement with the corresponding feed bars 112, 113.

When in this position of the feelers during the rotation of the eccentric 104, the roller 109 mounted on the arm 108 is depressed by the nose 110, the feed bar 112 which is engaged with the arm 108, produces by means of the pulling pawl 116, a partial rotation of the worm 106ª fixed on the latter.

At the same time, owing to the aforesaid parts 113, 116ª and 106ᵈ, the lever 108 causes a rotation of the worm 106ᵇ with the result that in consequence of the engagement of the latter with the teeth of the fixed bar 20, the frame 80, together with the knotting mechanism carried by it is slid along the two warps in opposition to the direction of the arrow shown in Fig. 13.

As already mentioned, the pair of clamping bars 20 is fixed as regards movement in the direction of its length, whereas the pair of clamping bars 25 are slidable.

If, as above assumed, the oscillation of the lever 108 causes the two worms 106ª and 106ᵇ mounted on the columns 84 and 85, to rotate, clamping bars 20 and 25 move equally in opposite directions but the clamping bars 25 are carried along also with the frame the same amount as they have been moved in the opposite direction and hence it has no absolute movement.

This applies until the two warps are situated facing each other in such a manner that the extreme one of the thread of the one warp that has not yet been knotted together is situated opposite the extreme thread (not yet knotted together) of the other warp.

If, for any reason, for instance the thread feeler 121, strikes the first thread of the warp 10 (Fig. 13), the said thread will exert upon the said feeler a pressure under whose influence the outer arm of the feeler 121 will come under this bar (on the next ascent of the bar 113,) and stop the descent and consequently also the motion of the pawl 116ª, and therefore stop the feed of the knotting mechanism until the pressure of the said thread ceases, that is to say, the extreme threads of the warps are again situated facing one another.

If the threads of the warp 8 bear against the feeler 120, the outer end of the latter, on the next descent of the feed bar 112 will engage the notch 122' of the latter and thus prevent the ascent.

On the next descent of the corresponding arm of the lever 108 the joint pin will move idly in the slot of the feed bar 112 so that the ratchet wheel 106ᶜ and with it the worm mounted on the column 84, will not rotate and consequently there will be no relative movement toward the latter and the clamping bar 25 engaging with it, that is to say, the warp carried by it.

In the last mentioned descent of the lever 108 with the roller 109 the bar 113 is raised and by the push pawl 116ª the ratchet wheel 106ᵈ and with it the worm 106ᵇ mounted on the column 85, will be rotated.

However, since, as hereinbefore stated, the clamping bar 20 engaging with the said worm 106ᵇ is stationary as regards motion in the direction of its length, there will yet be a movement of the frame 80 through the distance of one tooth in opposition to the direction of the arrow (Fig. 13) that is to say towards the warp 10; whereas in consequence of the engagement of the worm 106ª with the teeth of the corresponding bar 25 the latter is shifted through the distance of one tooth in opposition to the direction of the arrow, consequently the bar 25 is carried along by the worm 106ª.

The threads are continually being knotted away from the warp 10 by the knotting mechanism and the clamping bar 25 is moved through the distance of one tooth at each feed movement in the opposite direction so that any accidental difference in the position of the two warps relatively to each other is quickly compensated.

Should the warp web 8 stand back from the thread feeler 120 either by reason of a gap in the warp web (Fig. 13) or by reason of an irregular distribution of the warp threads in clamping them in the clamping bars the outer portion of the thread feeler 120 will be moved by the spring 122 out of the range of the feed bar 112, with the above described result, that the clamping bar 25 will be pushed forward in the direction of the arrow (Fig. 13) until the warp web 8 has come on a level with the warp web 10.

If the warp web 10 should stand back from the thread feeler 121 for reasons above stated, the feed bar 113 will be fed continuously onwards so that the clamping bar 25 will be carried along by it until the gap has been overtaken.

In all cases, that is to say, if there are gaps in warp webs in the case of irregular distribution of the threads in the warps and if one or the other warp web should advance too much or remain behind, the feeding device will have the effect of maintaining the warp webs automatically at equal levels.

As will be perceived from Figs. 15 and 19, the aforesaid adjusting arm 124 is jointed to the frame 80 at 125 by means of the pin 126.

By means of a pin 127 provided with a handle, acted upon by a spring 128, the arm 124 can be maintained in the vertical position and in a horizontal position by engagement in one of the holes 129 and 129$^a$ provided in the frame 80; namely, in the vertical position during the knotting, and in the horizontal for the purpose of shifting the knotting mechanism after the work has been completed out of the range of the clamping bars on to the aforesaid tightening bearing 37 for the purpose of releasing the clamping bars which are now to be rotated out of the way.

The adjusting arm 124 has pivoted to it the aforesaid web guide 114, and below the latter there is provided also on the adjusting arm 124 a removable bridge 130 (Figs. 15, 20 and 21), in the centre of which are fixed two wedge plates 131 and 132 that are separated from each other by a spacing piece 133.

In the forward movement of the carriage along the clamping bars the wedge plates slide between the warp webs 8 and 10 and force the foremost threads of the two webs slightly apart for the purpose of increasing their tension.

On the bridge 130 which is illustrated in Figs. 20 to 24 in side elevation, plan and front elevation respectively, there are rotatably mounted at 134 and 134$^a$, two needle carriers 135 and 135$^a$, whose forked ends carry between centres 136, two whorls 137 and 137$^a$ in which the selecting needles 138 and 138$^a$ are inserted and fixed by means of small screws (Fig. 23).

In the shank of each selected needle 138 there is fixed by means of small screws 141 a sewing needle 140 whose point can be moved more or less away from the point of the shank by means of the said screw 141$^a$, for the purpose of adapting it to coarser or finer yarns.

In the eyes 144 and 144$^a$ of the bridge 130, there are further rotatably mounted two small pressure levers 145 and 145$^a$ (Fig. 22), each of which is connected by a spring 146 to an arm of the needle carrier in such a manner that the small pressure levers are pulled against stop pins 148 provided for this purpose on the bridge, whereas the needle carriers are pulled against the small pressure levers.

The arms 147 carry further a small screw-threaded rod 149 provided at one end with an adjusting nut and formed at its other end with a perforated lug for the attachment of weak spring 150. The other end of this spring is attached to one of the whorls 137 and the whole serves for adjustably bringing the selecting needles 138, 138$^a$ against the warp webs 8 and 10.

On the aforesaid column 84 for the reception of the worm 106$^a$ there is mounted a lever 151 (Figs. 16, 17, 19 and 30) one arm of which carries an antifriction roller 152, whilst a two-part tongs lever 153 is jointed to the other arm.

On the column 85 there is fulcrumed the knotting lever 154 with an anti-friction roller 155. Each of the levers 151, 154 is drawn against the corresponding cam of the bridge 104 by means of a spring 156, 156$^x$, attached at one end to the end of the corresponding lever and at its other end to the frame 80 (Figs. 16 and 17).

The tongs lever 153 can be stopped for the same purpose as the hereinbefore described adjusting lever 124, by means of the handled screw 158 at the points 159 and 160.

The tongs lever 153 consists of two parts held together by screws 161, 162 and corresponding slots so that the upper part of the lever can be moved vertically and laterally in relation to the lower part.

The lower part of the tongs lever carries the hereinafter described tongs for gripping the warp ends that have been previously twisted into a knot. The knotting lever 154 is provided at its lower part with a guide for the rack 165 (Figs. 16, 17, 18 and 29). This guide is closed by a cover 164.

The cover has further an eye 166 for the reception of a pin with a large pinion 167 with a knotter 168 screwed in the pin.

The large pinion 167 meshes with the rack 165. On a pin 169 fixed to the frame 80 there is fulcrumed a lever 170 carrying an anti-friction roller 171, that works on the eccentric cam 174 (Figs. 16, 17, 19 and 31).

An arm 170 is connected by a joint member 172 to a coupling rod, 173, the lower end of which engages the rack 165.

From the foregoing it will be perceived that the cam 174 moves the rack 165 up and down, and consequently the pinion 167 together with the knotter 168 is caused to rotate forwards and backwards for a certain distance.

A spring 175 attached at one end to the joint member 172 and at its other end to the cover 164, causes the arm 174 to remain with its anti-friction roller 171 always on the cam 174.

The cam 176 acts upon the roller 155 of the knotting lever 154, and the cam 177 acts upon the roller 152 of the tongs lever 151.

The proportions are made such that the two levers are moved simultaneously, away from and towards each other under the influence of the coiled springs 156 and 156¹.

The knotting lever 154 and the tongs lever 153 have each an eye 180, 180ᵃ in which is adjustably inserted a stop 181, 181ᵃ, made of wire bent at an angle (Figs. 16 and 22).

If now the two levers 153, 154 are moved towards each other, the stops 181, 181ᵃ will strike the small pressure levers 145, 145ᵃ, so that the selecting needles 138, 138ᵃ are caused by the action of the springs 150, 150ᵃ to bear elastically against the warp webs 8 and 10.

In this movement the needle carriers 135, 135ᵃ are also rotated slightly outwards so that the needle points 140 come behind the first thread of the warps.

When the levers 153, 154 are moved apart, the pressure levers 145, 145ᵃ together with the needle carriers 135, 135ᵃ, will be caused by the action of the springs 146 to return into their striking position so that the points of the needles 140 engage between the foremost threads and the foremost but one threads of the two warps 8 and 10 and carry respectively the first thread by means of the press stops 182, 182ᵃ in front of the front end of the wedge plates 131, 132.

Directly over the knotter 168 there is screwed to the lever 154 a member 184, (Figs. 17, 29 and 40 to 43), the front part of which is horizontally forked at 185.

This fork serves to receive the small pressure lever 186 of the tongs lever 191 whilst a vertical slot 185ᵃ extending through the fork serves for the reception of the threads 8 and 10 that have been pushed forward.

To a lug 187 of the bridge 130, there is jointed a double shears composed of two arms 188 and 188¹ (Figs. 17 and 26). The arm 188 is engaged by the loop end of a rod 189 that is mounted adjustably on the knotting lever 154.

When the two levers 153 and 154 are moved apart, the double shears will open, whereas the former will move towards each other so that the latter will close and thereby cut the warp threads 8, 10 situated between them.

As already stated the ends of the two warps 8 and 10 must be knotted together for which purpose the following parts are provided.

On a fork 191 fixed to the tongs lever 153 (Figs. 17, 25 and 28) with the fixed tongs half 192 there is rotatably bolted the disengaging member 193 with the other tongs half 194.

This disengaging member is formed at 195 as a hook which is pulled by the small spring 196 in combination with an extension of the pressure lever 186 against the latter.

This small spring 196 has also the function of closing the tongs by means of the disengaging member 193. Further, the disengaging member 193 comprises an extension having a downwardly directed stop pin 197 for opening the tongs.

In Fig. 28 the tongs is shown open. The nose of the hook 195 bears on the back 198 of the pressure lever 186, which by the action of the small spring 196 is caused to rotate outwards as far as its stop 199, in which position it holds the tongs open.

When the two eccentric levers 153 and 154 meet, the pressure lever 186 is knocked so far against the forked stop 185 until the warp threads 8 and 10 that have met at the same time are held firmly.

The tongs 192, 194 are still open in front of the mouth of the knotter 168, because the nose 195 of the pressure lever 186 has not yet moved away quite over the back 198.

At this moment the knotter 168 is caused to rotate by the action of the cam 174 so that the two threads are wound upon the said knotter.

Now the open tongs is caused by the cam 177 to enter the mouth of the knotter 168, so that the pressure lever 186 is further pressed until the nose 195 engages with the back 198 and closes the tongs (Fig. 25).

When then the two levers 153 and 154 again swing apart, the knotter 168 rotates backwards and the tongs draws the gripped threads together with the formed thread-loop off it until the complete knot is formed.

Arrived at the end of the outward movement of the tongs lever 153, the pin 197 strikes the stop 200 (Fig. 17), which is movably mounted on the adjusting arm 124.

By this means the tongs 192, 194 open and the pressure lever 186 is caused by the spring 196 to return into its striking position.

The knotted and released threads are first drawn at 201 (Fig. 19) into a deflecting casing 202 (Figs. 15 and 19) in order that they shall not become entangled with the knotting device.

As hereinafter stated the levers 135 and 135ᵃ perform oscillations wherein in the normal course of the operation the needles 138, 138ᵃ each select a thread from each web 8 and 10.

It may happen for any reason, for instance if a thread to be selected by the needle has a thickened place, or if a gap has occurred in any one of the warp webs, the corresponding needle cannot select and push forward a thread. In such a case the knotting lever or tongs lever must cease its activity until the missing thread has assumed its position.

For this purpose two mutually facing double lever feelers 205 and 206 are mounted so as to be easily rotatable in the eyes 204 and 204a of the bridge 130 shown in front elevation and plan in Figs. 32 to 37.

Both these double feelers consist of two parts, the adjusting wings 205 and 206 above the bridge 130 and the thread feelers 205¹ and 206¹ below the said bridge.

These parts are connected together by means of studs riveted to the said feelers and are constantly pulled against the stops 207 and 207a by a small common spring 206a.

Figure 32:
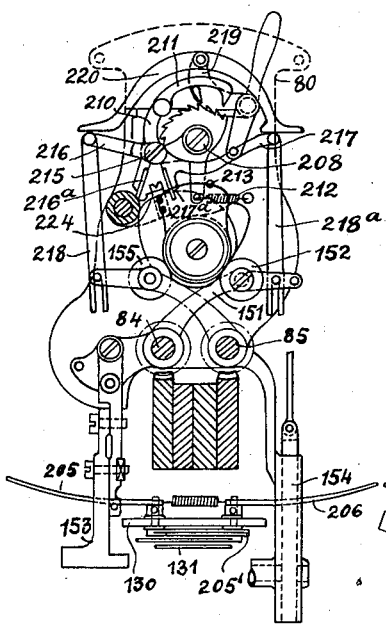
Figure 33:
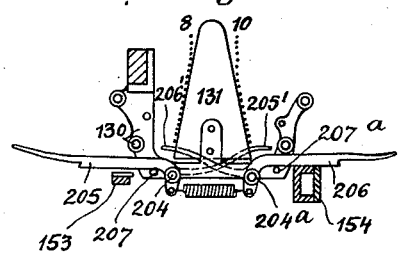

In the position shown in Figs. 32 and 33, the tongs lever 153 and the knotting lever 154 are situated in their innermost position. In this position the two adjusting wings 205 and 206 are against their stops, 207 and 207a being the stop pins.

The thread feelers 205¹ and 206¹ are directed towards the warp webs 8 and 10. In this position likewise the thread selecting needles 138 and 138a are capable of engaging each one thread.

Figure 35:
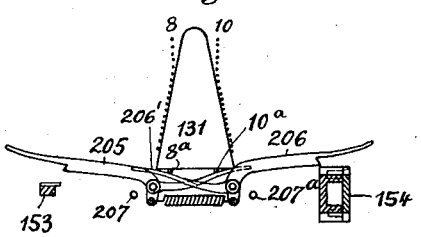

Simultaneously with the moving part of the two levers 153 and 154 the needles bring the gripped thread upon a level with the wedge plates into the position 8a and 10a (Fig. 35).

The threads thus pushed forwards have pushed back the thread feelers 205¹ and 206¹ to some extent and thus brought the adjusting wings 205 and 206 out of engagement with the levers 153 and 154.

The latter can, therefore, move together freely and knot the two threads 8a and 10a together whilst the feeler levers 205 and 206 return into stopped position against their stops.

Figure 36:
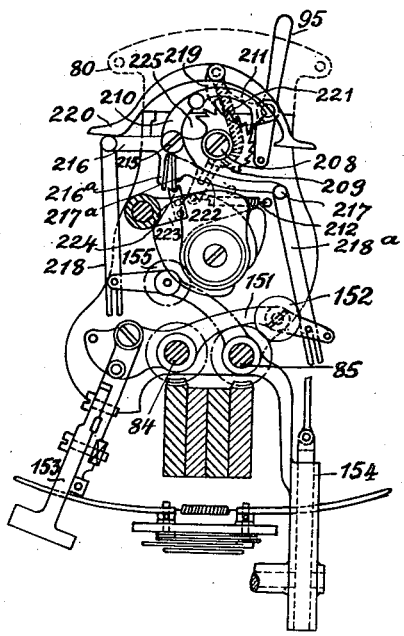
Figure 37:
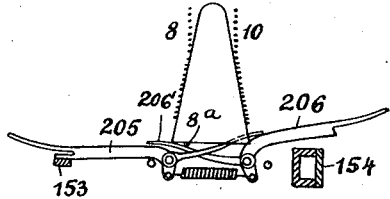

In Figs. 36 and 37, only the selecting needle 138 has pushed forward a thread 8a from the warp web 8. The selecting needle 138a has not brought a thread for some reason. Consequently only the thread feeler 206¹ was knocked back whilst the other remained in position against its stop. In this position the adjusting wing 205 is caused by its stop nose to come into engagement with the tongs lever 153 and thus does not allow the latter to swing against the knotting lever 154, the movement of the arm 154 being taken by the spring 156.

Since the thread feeler 206 has been pushed back by the advanced opposite thread 8a, and remains so pushed back, the knotting lever 154 is able to continue its movement until finally a thread is pushed forward out of the warp web 10 and releases the tongs lever 153, whereupon the series of operations is repeated as described with reference to Figs. 34 and 35. From the foregoing it will be readily understood that when a thread is pushed forward from the warp 10, whilst a thread from warp 8 is absent, the adjusting wing 206 will arrest the oscillations of the knotting lever 154, whilst the tongs lever 153 will continue to oscillate.

The feelers 205 and 206 thus prevent only one thread from being cut and knotted since, of course, always one thread from the old warp has to be knotted with a thread from the new warp.

As hereinbefore stated, if a warp thread should be absent, then one or the other of the two levers 153 or 154 will continue to oscillate without any threads being knotted together. Of course, this idle motion of the knotting apparatus must continue only for a limited time, on the expiration of which the person attending to the machine should remove the disturbing factor.

Figure 34:
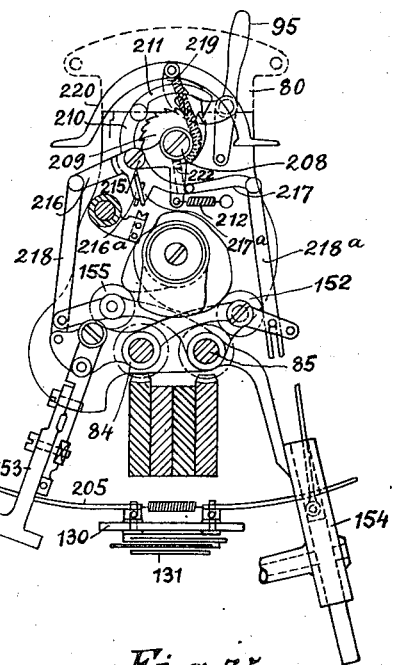

In order to set the knotting apparatus out of operation automatically after the expiration of this time, the following arrangement is provided which is illustrated in Figs. 32, 34 and 36 in front elevation, in Fig. 38 in side elevation and in Fig. 39 in plan.

On a pin 208 fixed to the frame 80 there is mounted loose a ratchet sector 209 having ten teeth and a ratchet lever 210 with a pivoted pawl 211 engaging in the ratchet sector. A spring 212 pulls the ratchet lever 210 against a stop 213. On the ratchet lever 210 there is mounted a pin 215 carrying two repeating levers 216 and 217 having downwardly extended ratchet links 216a and 217a.

To the repeating lever 216 there is jointed a push lever 218 which is formed at its lower end with an open slot and which is loosely connected by means of a headed stud to the knotting lever 154. The repeating lever 217 is similarly connected by means of a push lever 218a to the tongs lever 153.

A counter-pawl 219, having a pivoted disengaging link 220, is pivoted to the bearing 94 and is rigidly connected to the disengaging fork 95.

This counter-pawl has further attached to it a spiral spring 221 engaging at its other end with a pin 222 which is fixed on the ratchet sector 209 for the purpose of placing the driver 93 out of claw-engagement with the worm 91, (Fig. 14) as hereinafter described.

The hereinbefore mentioned lever 170 on the pin 169 and whose arm is not shown, has a lug 223 with a ratchet angle piece 224 screwed to it.

If now, as in Fig. 37 (plan), for instance, a thread of the warp 10, has not been pushed up to the level of the wedge plates 131, 132, and consequently the tongs lever 153 is locked by the feeler lever 205, the lever 151 will remain depressed.

At the same time the push lever 218a supported by the arm 151, has depressed the repeating lever 217 so that the latter, by means of its ratchet link 217a comes into engagement with the ratchet angle piece 224 of the lever 170.

This lever 170 then swings upwards, whereby the ratchet lever 210 rotates by means of its pawl 211 the ratchet sector 209 forwards through the distance of one tooth. The counter-pawl 219 prevents the return of the ratchet sector.

This ratchet motion continues so long as the lever 153 remains locked, that is to say, so long as no thread of the warp web 10 is pressing against the arm 205.

Meanwhile the knotting lever 154 continues to oscillate, and, for instance, after the fourth oscillation the missing thread appears and releases the tongs lever 153 so that four teeth have been passed through.

Since, however, the ratchet sector 209 has ten teeth and consequently the automatic stoppage of the knotting mechanism at each missing thread takes place only after ten revolutions, then if the missing thread should appear in the meantime, four, five to nine teeth must be again travelled over because the knotting mechanism continues to work and the operations can begin afresh.

If one eccentric lever, or both (153, 154) are prevented from swinging, a pawl 211 and a counterpawl 219 are in engagement with the ratchet sector 209 because the ratchet motion must operate in this case.

If, however, both eccentric levers are again in motion, then as they move together the two repeating levers 216 and 217 are raised by means of the push levers 218 and 218ª and thereby reach the disengaging link 220 to such an extent that the counter-pawl 219, and through it also the ratchet pawl 211 are lifted out of the teeth of the ratchet sector 209 and consequently the latter is able to be returned into its initial position by the action of the spring 221 as shown in Fig. 32.

In this position the ratchet links 216ª and 217ª are situated so far apart as to allow the ratchet angle piece 224, which at this moment comes into the highest position, to pass freely between them without feeding.

If in opposition to the above case a thread of the warp web 8 should be missing and the other thread has reached the level of the wedge plates 131, 132, the knotting lever 154 will be locked and the tongs lever 153 will continue to move.

Consequently the ratchet link 216ª comes into engagement with the ratchet angle piece 224 and will likewise feed.

If in consequence of missing warp threads the ratchet sector 209 is rotated through ten teeth then at the next ratchet strike the counter-pawl 219 will be caused by the action of the spring 221 to engage in the notch 225 of the ratchet sector 209, and since the counter-pawl 219 is rigidly connected to the disengaging lever 95, the latter also will be rotated and through it the driver 93 will be brought out of claw-engagement with the worm 91 and the mechanism will be stopped.

When the impediment has been removed, the knotting mechanism can be set into operation again by throwing-over the lever 95.

The manipulation of the improved machine and its operation are as follows:—

The remainder of the woven warp 10 with its fell together with the heddles 9 and reed 9ª, is first placed upon the supports 14 and 14ª on the knotting beam 4, and hung on to the rake 13. Then the two arms 43 and the sector 46, are placed in the position shown in Fig. 9, and the clamping bar 20 on the levers 19 is turned down on to the wooden slat 46.

The upper half of the clamping bar has already been unbolted, then the warp threads are brushed in sections by means of a brush away from the heddles 9 as parallel as possible to the card 53 and inserted therein. After the whole width of the warp has been thus treated the upper clamping part is bolted on and thus the warp is clamped. Then the clamping bar 20 on the levers 19 is turned up and locked by means of the pins 54. The projecting thread ends are cut off and finally the warp 10 is strained by means of the crank 16.

Then the warp beam 8¹ with the new warp 8 thereon is placed in the sliding bearings 7, and the warp 8 is clamped in the same manner as the warp 10.

The two arms 43, as well as the sector 46, are brought into the position shown in Fig. 7, and then the clamping part 25 on the arms is turned over on to the wooden slat 45. The upper half of the bar has already been unbolted.

Then the warp ends are brushed and inserted likewise in portions away from the roller and as parallel as possible over the bar on to the card 53. The upper half of the clamping bar is bolted and thereby the warp is clamped in position.

The projecting warp ends are then cut off, the bar 25 on the arms 24 is turned up and hung on to the rollers 26 and 26ª.

By this turning up movement the new warp web is placed automatically against the lower clamping bar half 25ª, so that now the upper half can be bolted on to the same. This warp can then be strained by means of the hand-wheel 32, and finally the wooden slat 45 can be returned into its position of rest shown in Fig. 1, whereupon the warps are ready for the knotting operation.

If, when the motor 5 is running, that is to say, the rope pulley 34 is revolving, the worm 91 be coupled by the disengaging fork 95, by means of the driver 93 to the shaft 90, the worm wheel 98 will be caused to rotate together with the four-fold eccentric 104 that is connected to it by means of a driving pin.

Under the influence of the eccentric cams 176 and 177, the tongs lever 153 and the knotting lever 154 are caused to oscillate (Figs. 16, 17 and 22). In the inward swinging of the tongs lever 153 and of the knotting lever 154, whereby the selecting needles 138, 138ª move each up against the first thread of the two warp webs and are drawn back to a certain extent, they will in their next following movement apart engage each one thread.

These threads are pushed by the press levers 145 in front of the wedge plates 130, 131 (Fig. 22), and on sliding off from these plates the said threads pass from the straddling position shown in Fig. 17 into the extended position, but do not yet enter into the double shears 182.

In the next inward swinging of the levers 153, 154, the two thread ends 8 and 10 are pushed together by the pressure lever 186 and the part 184 into the slot 185 of the latter where they are held fast, whilst the press lever 186 enters the slot 185 of the part 184.

The mentioned inward swinging of the levers 153 and 154 insures of the threads being pushed in the double shears and cut above the bridge.

Then the open tongs that has remained stationary in front of the mouth of the knotter 168, enters the mouth of the knotter. The nose 195 slides over the back 198 of the press lever, closes the tongs, and thereby grips the threads.

If a warp end is selected from the warp 8 while an end fails from the warp 10, the lever 153 will be held out of operation while the lever 154 will operate. The thread 8 is out of the path of the shears 188 as long as the lever 153 is at rest because the blades or jaws of the shears are very short (see Fig. 26). The position of the thread 8 in Fig. 26 corresponds to that illustrated by the inner right line of Fig. 14. When subsequently a warp end from warp 10 is selected the lever 153 begins to swing and pushes the thread in the shears 188 and the mechanism operates as previously mentioned.

In the next following outward oscillation of the two levers 153, 154, the pin 197 of the movable tongs part strikes the stop 200, and opens the tongs, the press lever returning back into position to serve as a stop.

The knotting together of the two threads is illustrated on a larger scale in Figs. 40 to 44.

For the sake of simplicity, the two threads are shown as one.

After the threads have been brought together by the press 186 into the slot 185 of the stop 184 in the inward movement of the levers 153, 154 (Fig. 40), the action of the cam 174 upon the lever 170 causes, by means of the coupling rod 173, the shifting of the rack 165, and thereby the knotter 168 is rotated by means of the long pinion 166.

During the first half revolution of the said knotter, the threads are gripped by the slightly outwardly bent point 203 of the knotter and partly wound around the knotter 168 (Fig. 41).

After a further half revolution of the knotter the upper and the lower part of the thread begin to cross each other (Fig. 42).

After a further quarter revolution, these threads cross each other completely (Fig. 43). In this position the ends of the threads are gripped as already mentioned, by the tongs 192, 194, and in the next following outward movement of the levers 153, 154, the previously formed loop is drawn off the knotter in its return rotation and pulled out to form the complete knot.

The knotted threads which are to be released are conveyed away through the slit 201 into the deflecting casing 202 (Figs. 15 and 19).

When the knotting is completed, the nose 110 of the eccentric 104 acts upon the roller 109 of the oscillating lever 108, with the result that the ratchet bars 112 and 113 are raised or lowered, and the pawls 106ᶜ and 106ᵈ cause a rotation of the worm wheels 106ª and 106ᵇ, thereby producing again an advance of the main bearing 80 together with the knotting mechanism carried by it, towards the two warps 8 and 10, so that on the inward movement of the levers 153, 154, the needles 138 and 140 respectively 138ª and 140ª, can find and grip a thread.

Should, for any reason, the needles 138 and 140, or respectively 138ª or 140ª, not be able to feel any thread, then the influence of the feeler levers 205 and 206 or 205ª and 206ª respectively, will have the result, in the manner already described, of locking either the lever 153 or the lever 154, or both.

If the lever 154 is locked, the ratchet bar 112 and with it also the worm 105ª will be rested, with the result that the clamping bar 25, together with the warp web 8 is pulled onwards in opposition to the direction of the arrow in Fig. 13.

If, in the reverse case, the above mentioned lever 154 is not locked, then the ratchet bar 112 will come into operation.

In that case then, the ratchet bar 113 will be placed out of operation so that the clamping bar 25 with the warp web 8 will be pushed back in the direction of the arrow.

If both ratchet bars come out of operation, the knotting mechanism will be stopped, that is to say, it will not be advanced any further.

If after ten unsuccessful oscillations one of the selecting devices has not yet brought up any warp thread, then, as already described, the knotting mechanism is thrown automatically out of operation.

As already stated, the old warp need not necessarily be removed from the loom in order to be placed upon the framing 1; on the contrary the beam 4 with the parts supported by it, can be brought to the loom and the knotting together of the threads of the new warp with those of the old warp can be effected on the said loom.

What I claim is:

1. In a machine for uniting the threads of two warps, the combination of two pairs of clamping bars for holding the warps vertically side by side, a knotting mechanism situated straddlewise over the clamping bars, a carriage carrying the knotting mechanism and being guided by the clamping bars serving for holding the warps, means for causing the carriage to travel intermittently and across the length of the warps, a beam supporting the clamping bars for the old warp and removably mounted on the machine framing, in such a manner, that this beam together with the clamping bars, and the parts carried by the latter can be lifted off the machine framing and placed upon a loom for the purpose of knotting a fresh warp therein.

2. In a machine for uniting the threads of two warps, the combination of a pair of clamping bars for holding the old warp vertically, a pair of clamping bars for holding the new warp vertically, each pair comprising two clamping bars being detachable from each other levers being capable of rocking on a horizontal axis and supporting said pairs of clamping bars, a slat, and two arms rotatably mounted in the machine framing and connected together by the said slat, the slat supporting the pairs of clamping bars when the mentioned levers are in its swung-out position.

3. In a machine for uniting the threads of two warps, the combination of a pair of clamping bars for holding the old warp, a series of pairs of clamping bars for holding the new warp, levers being capable of rocking on a horizontal axis and supporting said pairs of clamping bars, a slat, two arms rotatably mounted in the machine framing, the slat being rotatably mounted on the arms and supporting the pairs of clamping bars when the levers are in swung-out position, an adjusting element fixed on the slat and having opening therein, and a set pin lodged in one of the arms and serving to fix said element and the slat in various inclined positions.

4. In a machine for uniting the threads of two warps, the combination of a pair of clamping bars for holding the old warp, a pair of clamping bars for holding the new warp, levers being capable of rocking on a horizontal axis and supporting said pairs of clamping bars, a slat, two arms rotatably mounted in the machine framing, the slat being rotatably mounted on these arms, a locking sector fixed on the machine frame and having notches, a locking member slidable on one of the arms and a spring attached at one end to the locking member and at the other end to the arm carrying the member, said spring pressing the locking member in the notches of the sector.

5. In a uniting machine the combination of two pairs of clamping bars for holding the warps vertically side by side, a knotting mechanism, a carriage carrying the knotting mechanism, the bars for holding the warps serving to guide the carriage, a beam mounted on the machine framing and provided with a bar, and an arm mounted on the carriage, the arm sliding along the bar when the carriage travels on the frames, for the purpose of keeping the carriage in an upright position.

6. In a uniting machine the combination of two pairs of clamping bars for holding the warps vertically side by side, a carriage carrying the knotting mechanism, the frames for holding the warps serving to guide the carriage, a beam mounted on the machine framing and provided with a bar, a downward extension on the carriage, and a fork fixed thereon, the fork being situated straddlewise over the bar, for the purpose of preventing the tipping-over of the carriage.

7. In a knotting machine the combination of two pairs of clamping bars for holding the warps vertically side by side, a knotting mechanism, a carriage carrying said mechanism and being guided by the clamping bars, teeth on the clamping bars, worms engaging the teeth and being mounted on the carriage, each of the worms being provided with a ratchet wheel, in such a manner that the rotation of the ratchet wheels causes the carriage to travel along the clamping bars across the length of the warps.

8. In a uniting machine the combination of two pairs of clamping bars for holding the warps vertically, a knotting mechanism, a carriage carrying said mechanism and being guided by the clamping bars, teeth on the clamping bars, worms engaging the teeth and being mounted on the carriage, each of the worms being provided with a ratchet wheel, two pawls, each of these pawls engaging one of the ratchet wheels, two feed rods, each of these rods carrying at its bottom part one of said pawls, and means for alternately raising and depressing said rods for causing the worms to rotate and the carriage to travel intermittently along the clamping bars across the length of the warps.

9. In a uniting machine the combination of a carriage carrying a knotting mechanism, clamping bars for holding the warps vertically, the knotting mechanism being guided on said clamping bars, teeth on the clamping bars, worms engaging the teeth and being mounted on the carriage, each of the worms being providing with a ratchet wheel, two pawls, each of these pawls engaging one of the ratchet-wheels, two feed rods, each of these rods carrying at its bottom part one of said pawls, a driving-shaft mounted in the carriage, a worm fixed on the driving-shaft, a worm-wheel meshing with the worm, a shaft carrying the worm wheel and supported in the carriage, a cam fixed on the worm-wheel, an oscillating lever having two arms and carrying an antifriction roller, a spring pressing the roller upon the cam, each of the mentioned feed rods being connected by means of a pin and a slot with an arm of the oscillating lever, for the purpose that the rotation of the driving shaft causes the carriage to travel intermittently along the clamping bars across the length of the warps.

10. In a uniting machine the combination of a carriage carrying a knotting mechanism, a driving shaft for that mechanism and mounted in the carriage, a driving pulley fixed thereon, a worm loosely mounted on the driving shaft and formed with cross grooves, a drive capable of being slid on the driving shaft by means of a groove and feather claws on the driver for engaging the cross grooves on the worm, a shifting fork mounted on the frame of the carriage and engaging by means of two pins in a groove of the driver, so that the latter can be brought into and out of engagement of the worm by suitable rotation of the fork.

11. In a uniting machine the combination of a carriage carrying a knotting mechanism, a driving shaft mounted in the carriage, a driving pulley mounted thereon, two guide pulleys mounted loosely on the carriage framing, a beam removably mounted on the machine framing, a motor disposed at one end of the beam and having a driving pulley, a tightening bearing disposed at the other end of the beam and an endless rope passing around the said pulleys and serving to drive the knotting mechanism.

12. In a uniting machine the combination of two pairs of clamping bars for holding the warps vertically side by side, a knotting mechanism, a feeding rod on the carriage, a carriage carrying said mechanism, a downward extended arm on each side of the carriage, a rotary web feeler arranged on each of said arms, one arm of the feeler extending into the plane of the warp, whilst its other arm in a normal state of the warps, extends by the side of the path of the rod whereas on one of the warps meeting one of the web feeler arms whose other arm extends into the path of the corresponding feeding rod and thus arrests the latter.

13. In a uniting machine the combination of two clamping bars for holding the warps, a carriage carrying a knotting mechanism, a downward extended arm pivotally mounted on the carriage, a bridge carried by said arm, and wedge-shaped plates arranged on the bridge for passing between the warps on the advance of the carriage and spreading them out.

14. In a uniting machine the combination of a carriage carrying a knotting mechanism, a bridge carried by the carriage, an oscillatory needle carrier with two needles for each warp, said carriers being on the bridge, two oscillating levers mounted on the carriage, each of these levers having an antifriction roller, a driving shaft being mounted on the carriage, cams fixed on the shaft, and springs pressing the anti-friction rollers upon the cams, for the purpose that each of these needle carriers is rotated in one direction by one of the oscillating levers, and when released being returned into its position of rest by spring action, in the first case a thread from each warp is caught by the needles after each advance of the carriage and is conveyed to the knotting mechanism.

15. In a uniting machine the combination of a carriage carrying a knotting mechanism, a driving shaft mounted on the carriage, cams fixed on that shaft, a knotting lever mounted on the frame of the carriage and having an antifriction roller, a spring pressing said roller upon one of the cams, a rack mounted in the knotting lever, a long pinion meshing with the rack and also mounted in the knotting lever, a fulcrumed lever pivotally mounted on the framing of the carriage, an antifriction roller thereon, a spring pressing said roller upon one of the cams, a knotter fixed on the shaft of the pinion and intermediate parts between the fulcrumed lever and the rack for the purpose of moving the latter down and back and causing the knotter to rotate forwards and backwards for knotting two threads together.

16. In a uniting machine the combination of a knotting lever, a rack, a small pressing lever, a rack mounted in the knotting lever, a long pinion meshing with the rack and also mounted in the knotting lever, a knotter fixed on the shaft of the pinion, provided on the knotting lever, having slots extending at right angles to each other of which slots one serves for the reception of the threads ends to be knotted together, whereas the other slot serves to receive the small presser lever that conveys the said thread ends.

17. In a uniting machine the combination of a carriage carrying a knotting mechanism, a bridge carried by the carriage, a tongs mounted on the bridge for gripping the threads before these are knotted together, a knotting lever mounted on the carriage, a knotter rotatably mounted in the knotting lever, and a stop fixed on the bridge for opening the tongs and releasing the threads that have been knotted together.

18. In a uniting machine the combination of a carriage carrying a knotting mechanism, a downward extended arm pivotally mounted on the carriage, a bridge carried by said arm, wedge-shaped plates arranged on the bridge for passing between the warps, a shears arranged at the wider ends of the wedge plates, with cutters adapted to open towards both sides, a knotting lever, and intermediate parts between the knotting lever and the shears, for opening the shears when said lever swings outwards, and closing these when said lever swings inwards.

19. In a uniting machine the combination of a carriage carrying a knotting mechanism, a downward extended arm pivotally mounted on the carriage, a bridge carried by said arm, an oscillating lever carrying a tongs, another oscillating lever carrying a knotter, both levers being pivotally mounted on the carriage framing, two feeler-levers fulcrumed intermediately of their ends on the bridge, and controlled by springs, one arm of the feeler-levers being arranged to bear upon one of the warp threads, and to be held by the tension of the said thread in a position where the other arm of the feeler lever is held outside the paths of one of the said oscillating levers, whereas in the absence of said thread the last-mentioned arm of the feeler-lever is caused by the action of its spring to lock the said lever.

20. In a uniting machine the combination of a carriage carrying a knotting mechanism, an oscillating lever carrying a tongs, another oscillating lever carrying a knotter, both levers being pivotally mounted on the carriage framing, a ratchet sector mounted on said framing, and held by a spring in a position of rest; a ratchet lever for feeding the said sector forwards, a counter-pawl for preventing a return movement of the ratchet sector; two levers pivoted to the ratchet lever, with ratchet pawls capable of being brought alternately into engagement with a continually oscillating seat; the last-mentioned levers being connected by means of push-levers to the tongs lever and the knotting lever, the whole arrangement being such that, in the absence of a thread, the knotting mechanism will come out of operation after a determined number of misses of the needle carrier.

In testimony whereof I have signed my name to this specification in the presence of two subscribing witnesses.

ROBERT HARTMANN.

Witnesses:
C. MUILLIER,
HERMAN HUBER.